(12) United States Patent
Kamen

(10) Patent No.: US 7,952,591 B2
(45) Date of Patent: *May 31, 2011

(54) NAVIGATING PROGRAMMING CONTENT VIA MULTI-DIMENSIONAL SURFACES

(75) Inventor: Yakov Kamen, Cupertino, CA (US)

(73) Assignee: JLB Ventures LLC, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 12/716,978

(22) Filed: Mar. 3, 2010

(65) Prior Publication Data

US 2010/0162309 A1 Jun. 24, 2010

Related U.S. Application Data

(63) Continuation of application No. 10/059,547, filed on Jan. 28, 2002, now Pat. No. 7,701,468.

(60) Provisional application No. 60/274,458, filed on Mar. 9, 2001.

(51) Int. Cl.
- G09G 5/00 (2006.01)
- G06F 3/00 (2006.01)
- H04N 5/445 (2011.01)
- G06T 15/00 (2011.01)
- G06T 1/60 (2006.01)
- G06F 12/02 (2006.01)
- G06F 3/048 (2006.01)

(52) U.S. Cl. ........ 345/619; 345/419; 345/543; 345/581; 345/530; 725/39; 725/61; 715/700; 715/836

(58) Field of Classification Search ............ 725/44, 725/39, 61; 345/619, 419, 543, 581, 530; 715/700, 836

See application file for complete search history.

(56) References Cited

U.S. PATENT DOCUMENTS

| | | | |
|---|---|---|---|
| 4,621,259 A | 11/1986 | Schepers et al. | |
| 5,243,418 A | 9/1993 | Kuno et al. | |
| 5,414,773 A | 5/1995 | Handelman | |
| 5,479,268 A | 12/1995 | Young et al. | |
| 5,485,197 A | 1/1996 | Hoarty | |
| 5,526,034 A | 6/1996 | Hoarty et al. | |
| 5,532,754 A | 7/1996 | Young et al. | |
| 5,550,576 A | 8/1996 | Klosterman | |
| 5,550,578 A | 8/1996 | Hoarty et al. | |
| 5,684,525 A | 11/1997 | Klosterman | |
| 5,704,837 A | 1/1998 | Iwasaki et al. | |
| 5,724,492 A | 3/1998 | Matthews, III et al. | |
| 5,737,028 A | 4/1998 | Bertram et al. | |
| 5,751,282 A | 5/1998 | Girard et al. | |
| 5,808,613 A | 9/1998 | Marrin et al. | |
| 5,818,441 A | 10/1998 | Throckmorton et al. | |

(Continued)

FOREIGN PATENT DOCUMENTS

JP 410093880 4/1998

(Continued)

*Primary Examiner* — Hoang-Vu A Nguyen-Ba
(74) *Attorney, Agent, or Firm* — Banner & Witcoff, Ltd.

(57) ABSTRACT

A method to separately assign and modify multiple attributes of information and structure to an individual block or to a larger unitary whole comprised of multiple blocks is disclosed. A number of block instances of a block is determined. Each block instance is associated with one or more structure attributes. A number of data elements is determined. Each data element is associated with one or more information attributes. The data elements are mapped to the block instances. The mapped block instances are displayed contiguously.

20 Claims, 5 Drawing Sheets

U.S. PATENT DOCUMENTS

| | | | |
|---|---|---|---|
| 5,828,945 A | 10/1998 | Klosterman | |
| 5,841,563 A | 11/1998 | Effenberger | |
| 5,880,768 A | 3/1999 | Lemmons et al. | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,956,456 A | 9/1999 | Bang et al. | |
| 5,977,964 A | 11/1999 | Williams et al. | |
| 5,999,167 A | 12/1999 | Marsh et al. | |
| 5,999,187 A | 12/1999 | Dehmlow et al. | |
| 6,002,403 A | 12/1999 | Sugiyama et al. | |
| 6,029,195 A | 2/2000 | Herz | |
| 6,034,678 A | 3/2000 | Hoarty et al. | |
| 6,043,818 A | 3/2000 | Nakano et al. | |
| 6,061,055 A | 5/2000 | Marks | |
| 6,072,983 A | 6/2000 | Klosterman | |
| 6,075,575 A | 6/2000 | Schein et al. | |
| 6,078,348 A | 6/2000 | Klosterman | |
| 6,081,271 A | 6/2000 | Bardon et al. | |
| 6,100,883 A | 8/2000 | Hoarty | |
| 6,167,188 A | 12/2000 | Young et al. | |
| 6,169,543 B1 | 1/2001 | Wehmeyer | |
| 6,205,485 B1 | 3/2001 | Kikinis | |
| 6,205,582 B1 | 3/2001 | Hoarty | |
| 6,233,389 B1 | 5/2001 | Barton et al. | |
| 6,243,039 B1 | 6/2001 | Elliot | |
| 6,271,831 B1 | 8/2001 | Escobosa et al. | |
| 6,481,011 B1 | 11/2002 | Lemmons | |
| 6,732,367 B1 | 5/2004 | Ellis et al. | |
| 6,754,906 B1 * | 6/2004 | Finseth et al. | 725/45 |
| 6,925,650 B1 | 8/2005 | Arsenault et al. | |
| 6,986,154 B1 | 1/2006 | Price et al. | |
| 7,216,305 B1 | 5/2007 | Jaeger | |

FOREIGN PATENT DOCUMENTS

| | | |
|---|---|---|
| WO | 00/01149 | 1/2000 |

* cited by examiner

NAVIGATING PROGRAMMING CONTENT VIA MULTI-DIMENSIONAL SURFACES

CROSS-REFERENCE TO RELATED APPLICATIONS

This application is a continuation of U.S. patent application Ser. No. 10/059,547, filed on Jan. 28, 2002, by Yakov Kamen, and entitled "Mechanism and Apparatus for Construction of Modular-Based Interactive Programming Guides and TV Portals," which claims the benefit of priority from U.S. Provisional Patent Application Ser. No. 60/274,458, filed Mar. 9, 2001, and both applications are incorporated herein by reference in their entirety.

TECHNICAL FIELD

The present invention relates generally to field of multimedia communications, and more specifically, the present invention is directed to methods and apparatuses for using Interactive Programming Guides (IPG).

BACKGROUND

There are many implementations of Interactive Programming Guides (IPG) designed to assist viewers to easily navigate many programming options to select television programs and other video programming and services. With IPG, the viewers can search for programs by channel, time, title, etc. IPG also allows for advertisements and other marketing activities to be presented to the viewers.

When building an IPG, often the IPG comprises video representations of three-dimensional blocks, with each block assigned a certain function. Whenever the IPG or TV portal is to be modified, each block is manipulated individually, as is the case today. This can be time consuming when, for example, similar attributes are to be applied to all the blocks.

SUMMARY

A method to separately assign and modify multiple attributes of information and structure to an individual block or to a larger unitary whole comprised of multiple blocks is disclosed. In one embodiment, a number of block instances of a block is determined. Each block instance is associated with one or more structure attributes. A number of data elements is determined. Each data element is associated with one or more information attributes. The data elements are mapped to the block instances. The mapped block instances are displayed contiguously.

Other features of the present invention will be apparent from the accompanying drawings and from the detailed description which follows.

BRIEF DESCRIPTION OF THE DRAWINGS

The following drawings disclose various embodiments of the present invention for purposes of illustration only and are not intended to limit the scope of the invention.

DETAILED DESCRIPTION

In one embodiment, a method to separately assign and modify multiple attributes of information and structure to an individual block or to a larger unitary whole comprised of multiple blocks is disclosed.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Typically, IPG is implemented using blocks located in the special space (for instance when the space is three-dimensional, implementation is using three-dimensional blocks). In some cases, it may be advantageous to assemble these blocks contiguously (e.g., vertically and/or horizontally) to form a single, larger unit. With the ability to join the blocks together, certain attributes may be applied to all the blocks as a single unit. Furthermore, when viewed as a single unit, the IPG may be more visually distinguishable to the viewers.

Figure 1:
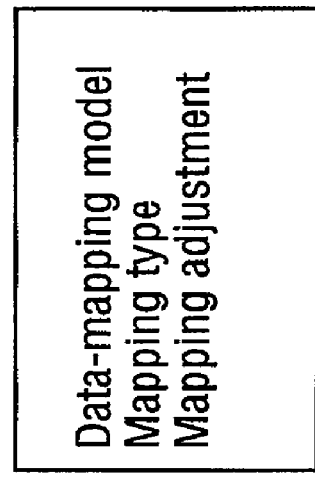
FIG. 1 illustrates an example of two three-dimensional blocks depicting certain functions within an IPG.
Figure 1:
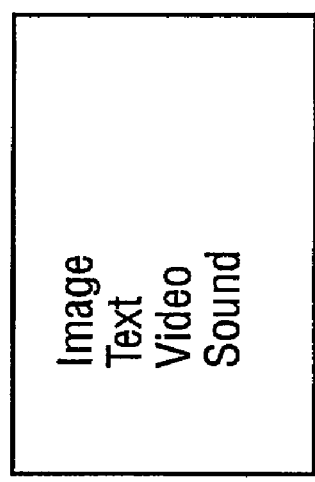
Figure 1:
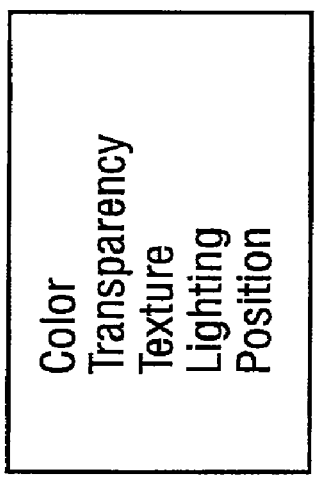
Figure 1:

FIG. 1 illustrates an example of two three-dimensional blocks depicting certain functions within an IPG. A typical block used to build IPG structures, such as structure 100, is a parallelepiped (a regular solid with six faces, each of which is a parallelogram). The advantage of using a parallelepiped is that it can be stacked, like a brick, and walls can be built from it. In some situations, an irregular six-sided solid, such as structure 110, may also be used and may be preferable for certain specific applications.

Each of the structures 100, 110 has six faces, and each face (or block) may be associated with a number of structure attributes in an attribute set. Thus, the structure 100 may be associated with multiple structure attribute sets. For example, the structure 100 may be associated with an attribute set including the attributes 101*a-n*. The attributes 101*a-n* may deal with the block itself, such as, for example, its color, its transparency, its texture, its lighting parameters (ambient, specular, etc.), its position in virtual 3-D space, etc. The structure 100 may be associated with another structure attribute set including the attributes 102*a-n*, which deals with information content, such as, for example, image, text (which can also be an image), video, sound, etc. The structure 100 may still be associated with a third structure attribute set including the attributes 103*a-n* which deals with an information data-mapping model, such as, for example, mapping type (linear, bilinear, etc.), mapping adjustment (clip, resize, etc.), etc.

Since the structure 100 is a parallelepiped, the six blocks or faces are similar, and as such, each block may be represented by a block instance. On the other hand, the structure (irregular solid) 110 may include six different blocks. Each of these blocks in the structure 110 may also be associated with any one or more of the structure attribute sets. It may be noted that each attribute set may have different number of attributes depending on the preference of the designer of the IPG or TV portal.

In one embodiment, the design of an IPG or TV portal is a modularized such that that the final design is represented as a union of positioned blocks (or elements or objects). For example, a bar is a union of multiple blocks, and a container object can serve as the background or "skin" (e.g., a room) of the bar.

Figure 2:
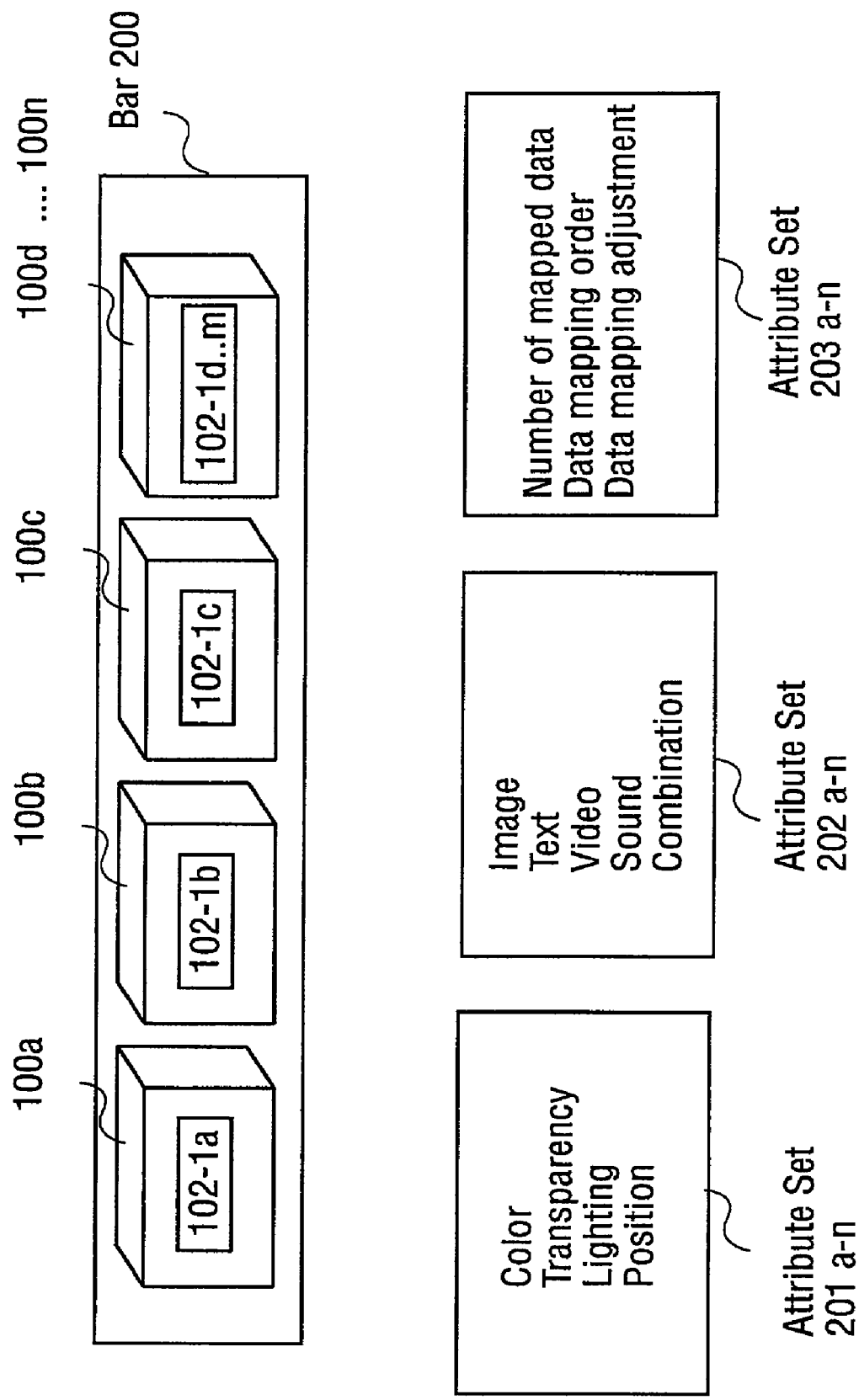
FIG. 2 illustrates an example of a bar including multiple blocks joined to form a single block in accordance to one embodiment of the present invention.

FIG. 2 illustrates an example of a bar including multiple block instances joined to form a single larger block in accordance to one embodiment of the present invention. The multiple block instances are joined together contiguously. The joined multiple block instances are presented contiguously a surface. In this example, bar 200 is assembled using multiple instances of a block (or face) of the structure 100 (shown in this example as block instances 100a, 100b, 100c and 100d). Although not illustrated, additional block instances may also be used to form the bar. The total number of block instances in the bar 200 is represented as "n". Each of the block instances 100a-100d may be used as distinct entities in the bar. Furthermore, each of the block instances 100a-100d may be separately controlled.

Each block instance may contain a pictorial image or text string. For example, the block instance 100a contains the image 102-1a, the block instance 100b contains the image 102-1b, the block instance 101c contains the image 1021c, and the block instance 100d contains the image 102-1d. The total number of different images contained in all the block instances is represented as "m". The images 102-1a, 102-1b, and 102-1c to 102-1m may represent to the viewer, visually or in some other manner, the available functions when the viewer selects any of the block instances 100a-100n. Each image or text string is referred to as a data element.

The bar 200 (or the surface) may have its own attributes. There may be multiple bar attribute sets containing bar attributes (or surface attributes). For example, one bar attribute set may include the attributes 201a-n and deals with the bar itself, such as the bar's transparency, lighting, etc. Another bar attribute set may include the attributes 202a-n and deals with information content, such as image, text, video, sound, and their combination. Still another bar attribute set may include the attributes 203a-n and deals with information data mapping such as number of mapped data, data mapping order, data mapping adjustment (clip, resize, etc.), etc.

Depending on the number of block instances shown and the number of available data elements (for example, images or text strings), there are three different possible situations. First, there are less block instances than data elements (n>m). Second, there are an equal number of block instances and data elements (n=m). Third, there are fewer block instances than data elements (n<m).

In one embodiment, all of the data elements are separated into an active data queue and an inactive data queue (not shown). The size of the active data queue is less than or equal to the number of block instances in the bar. When there are fewer block instances than the number of data elements, the active queue is full, and the inactive queue is not empty. The active queue is mapped onto the block instances in the bar in an order defined in the attribute list of the bar.

The inactive queue is stored in an appropriative storage place. With the active queue and the inactive queue of data elements, the viewer may change the mapping of data elements to the block instances. For example, the viewer may use a scrolling function of a remote control (not shown) to transfer some of the data elements from the active queue into the inactive queue, or vice versa.

The scrolling mechanism can be defined separately or as a mapping attribute of the bar. In one embodiment, when scrolling one data element, each click of the remote control swaps one selected data element from the active queue with one data element in the inactive queue. The swapping mechanism can be based on a first-in last-out (FILO) scheme, a first-in first-out (FIFO) scheme, or other control schemes well known to persons skilled in the art. In another embodiment, when scrolling multiple elements, each click of the remote control swaps "x" specific data elements from the active queue with "x" data elements in the inactive queue.

When there are an equal number of block instances in the bar and data elements (e.g., n=m), the active queue is full and the inactive queue is empty. In this situation, each block instance may be visible to the viewer.

Figure 3:
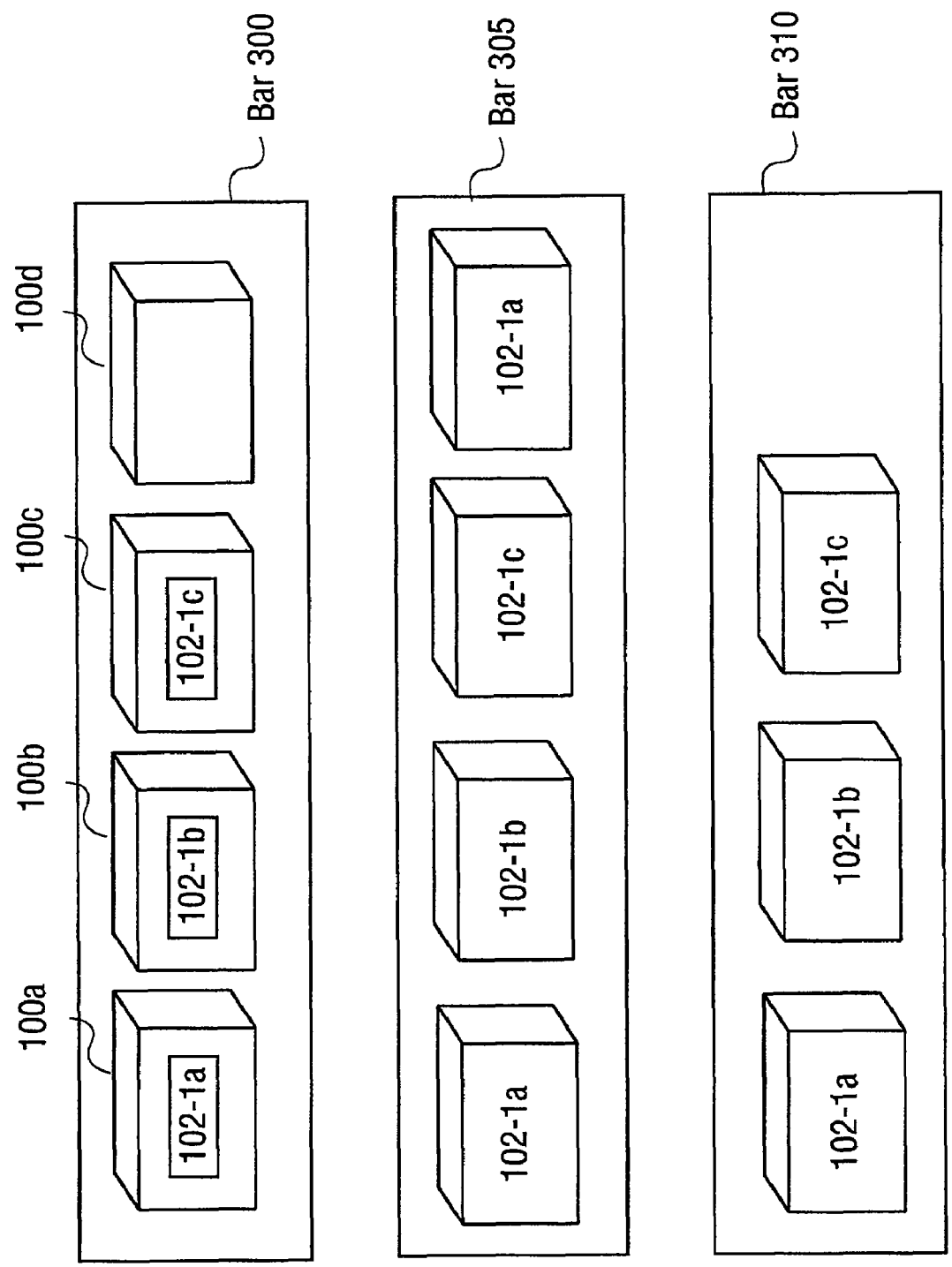
FIG. 3 illustrates examples of a bar when the number of block instances exceeds the number of data elements.

FIG. 3 illustrates examples of a bar when the number of block instances exceeds the number of data elements. When the number of block instances exceeds the number of data elements to be mapped, the viewer may see different versions of the bar. In a first version, certain block instances may be blind (e.g, no data is displayed), as illustrated by the bar 300. The block instance 100d does not display any data element and therefore is blind to the viewer. In a second version, certain data elements may be displayed (e.g., duplicated) in multiple block instances, as illustrated by the bar 305. The block instance 100d in the bar 305 displays the same data element 102-1a as the block instance 100a. In a third version, certain block instances may be dynamically deleted from the bar, as illustrated by the bar 310. The block instance 100d is deleted from the bar 310.

The decision on what block instance that have to be blind or deleted may be controlled by a special mapping attribute (for example, align left, align right, align center, etc.). The order of mapping may be controlled by a special mechanism that allows positioning of the data elements on top of the block instances based on, for example, its statistical usage (or popularity), fixed order, alphabetically, or by other, similar criteria.

Figure 4:
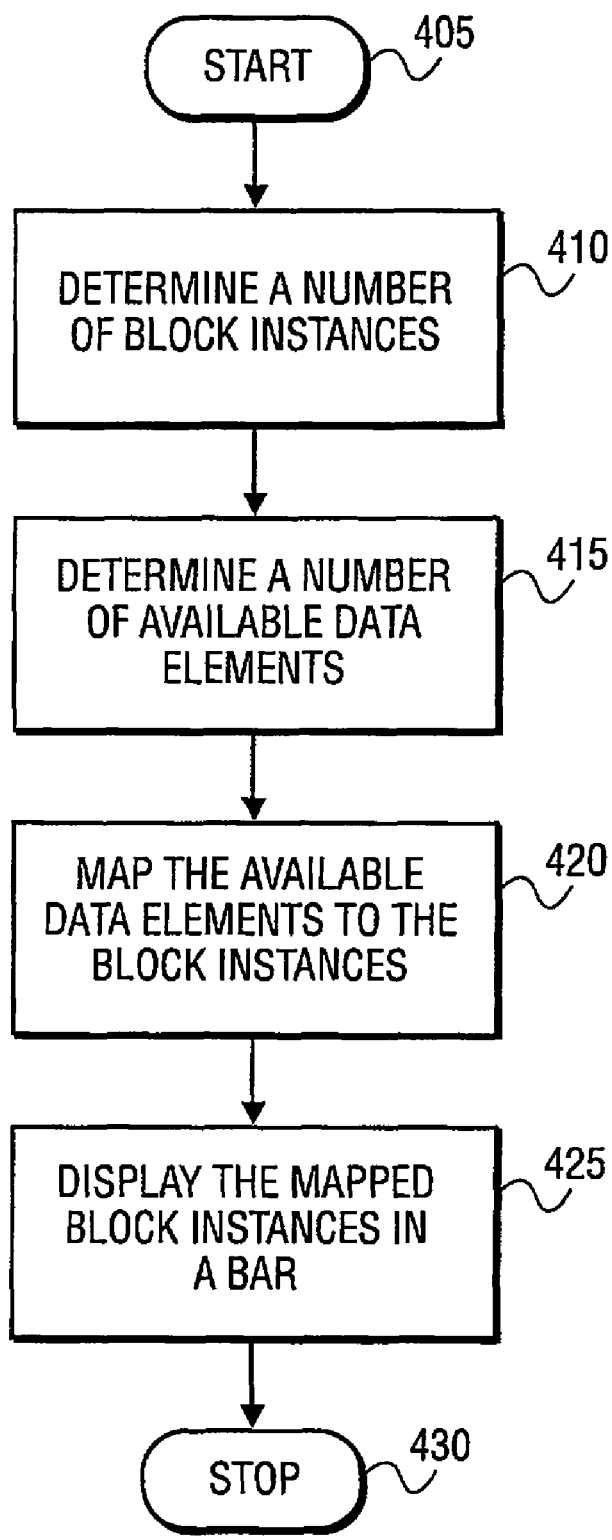
FIG. 4 is a flow diagram illustrating a process of forming an IPG by joining multiple blocks of attributes.

FIG. 4 is a flow diagram illustrating a process of forming an IPG by joining multiple blocks of attributes. The process starts at block 405. At block 410, the number of block instances to be included in a bar is determined. At block 415, the number of available data elements is determined. At block 420, the available data elements are mapped to the number of block instances to be displayed on the bar. As described above, the mapping of the data elements to the block instances depend on how the number of the data elements ("m") is compared against the number of block instances ("n"). At block 425, based on the mapping performed in block 420, the visible block instances are displayed to the viewer in a bar. In an alternative embodiment, the non-visible (or blind) block instance(s) are also displayed in the bar. The process stops at block 430.

Figure 5:
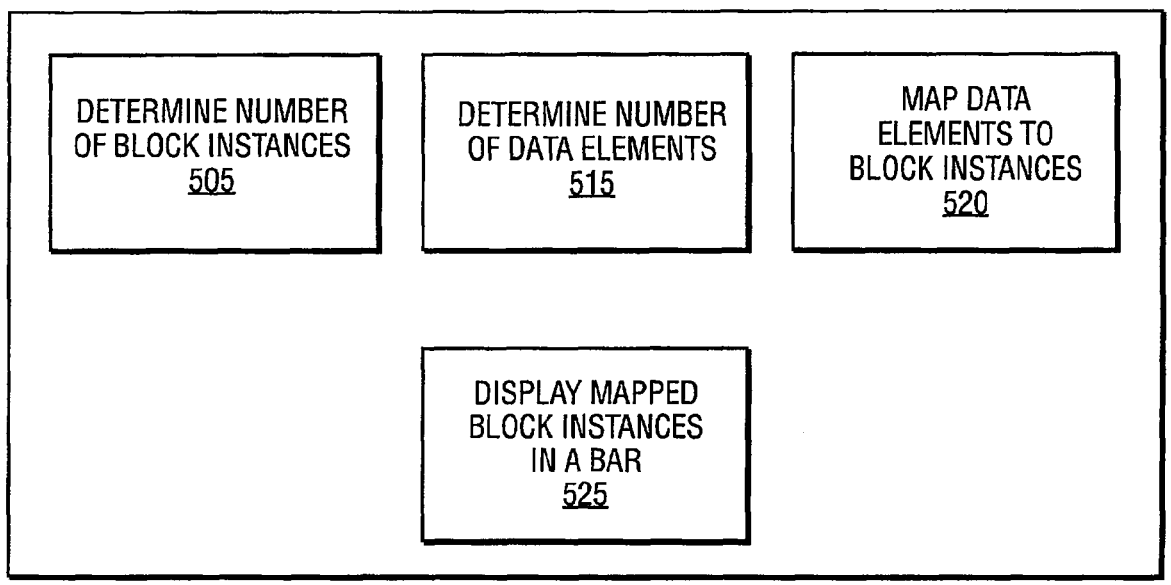
FIG. 5 illustrates an example of a machine-readable storage media in accordance with one embodiment of the present invention.

The operations of the various methods of the present invention may be implemented by a processing unit in a digital processing system, which executes sequences of computer program instructions that are stored in a memory which may be considered to be a machine-readable storage media. FIG. 5 illustrates an example of a machine-readable storage media in accordance with one embodiment of the present invention. The machine-readable storage medium 500 may include code 505 for determining the number of block instances that have attributes, code 515 for determining the number of available data elements, code 520 for mapping the number data elements to the number of block instances, and code 525 for displaying the mapped block instances in a bar to be viewed by the viewers.

The memory in the processing system may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions that can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A non-transitory computer-readable medium having computer-executable instructions stored thereon that, when executed, cause an apparatus to:
   determine a number of three-dimensional surfaces to be displayed in a programming guide, each three-dimensional surface being associated with at least one structure attribute;
   determine a number of data elements to be included in the programming guide, each data element being associated with at least one information attribute;
   select, based on the determined number of three-dimensional surfaces and the determined number of data elements, a mapping technique from a plurality of mapping techniques;
   display one or more three-dimensional surfaces corresponding to the determined number of three-dimensional surfaces to be displayed; and
   display one or more data elements corresponding to the determined number of data elements to be included in the programming guide, the one or more data elements being mapped to the one or more three-dimensional surfaces according to the selected mapping technique.

2. The non-transitory computer-readable medium of claim 1, having additional computer-executable instructions stored thereon that, when executed, cause an apparatus to:
   determine whether the determined number of three-dimensional surfaces is greater than the determined number of data elements;
   in response to determining that the determined number of three-dimensional surfaces is greater than the determined number of data elements, select the mapping technique that includes mapping at least two three-dimensional surfaces with the same data element.

3. The non-transitory computer-readable medium of claim 1, having additional computer-executable instructions stored thereon that, when executed, cause an apparatus to:
   determine whether the determined number of three-dimensional surfaces is greater than the determined number of data elements;
   in response to determining that the determined number of three-dimensional surfaces is greater than the determined number of data elements, select the mapping technique that includes not displaying at least one three-dimensional surface.

4. The non-transitory computer-readable medium of claim 1, wherein each three-dimensional surface is modifiable independently of at least one other three-dimensional surface.

5. The non-transitory computer-readable medium of claim 4, wherein a three-dimensional surface is modified by modifying at least one associated structure attribute.

6. The non-transitory computer-readable medium of claim 4, wherein a data element is modified by modifying at least one associated information attribute.

7. The non-transitory computer-readable medium of claim 1, wherein the displayed three-dimensional surfaces are included in a displayed bar.

8. An apparatus, comprising:
   a processor; and
   memory, coupled to the processor, storing computer-readable instructions that, when executed, cause the apparatus to:
      determine a number of three-dimensional surfaces to be displayed in a programming guide, each three-dimensional surface being associated with at least one structure attribute;
      determine a number of data elements to be included in the programming guide, each data element being associated with at least one information attribute;
      select, based on the determined number of three-dimensional surfaces and the determined number of data elements, a mapping technique from a plurality of mapping techniques;
      display one or more three-dimensional surfaces corresponding to the determined number of three-dimensional surfaces to be displayed; and
   display one or more data elements corresponding to the determined number of data elements to be included in the programming guide, the one or more data elements being mapped to the one or more three-dimensional surfaces according to the selected mapping technique.

9. The apparatus of claim 8, the memory storing additional computer-readable instructions that, when executed, cause the apparatus to:
   determine whether the determined number of three-dimensional surfaces is greater than the determined number of data elements;
   in response to determining that the determined number of three-dimensional surfaces is greater than the determined number of data elements, select the mapping technique that includes mapping at least two three-dimensional surfaces with the same data element.

10. The apparatus of claim 8, the memory storing additional computer-readable instructions that, when executed, cause the apparatus to:
    determine whether the determined number of three-dimensional surfaces is greater than the determined number of data elements;
    in response to determining that the determined number of three-dimensional surfaces is greater than the determined number of data elements, select the mapping technique that includes not displaying at least one three-dimensional surface.

11. The apparatus of claim 8, wherein each three-dimensional surface is modifiable independently of at least one other three-dimensional surface.

12. The apparatus of claim 11, wherein a three-dimensional surface is modified by modifying at least one associated structure attribute.

13. The apparatus of claim 11, wherein a data element is modified by modifying at least one associated information attribute.

14. The apparatus of claim 8, wherein the displayed three-dimensional surfaces are included in a displayed bar.

15. A method, comprising:
    determining, by a computing device, a number of three-dimensional surfaces to be displayed in a programming guide, each three-dimensional surface being associated with at least one structure attribute;
    determining, by the computing device, a number of data elements to be included in the programming guide, each data element being associated with at least one information attribute;
    selecting, by the computing device, based on the determined number of three-dimensional surfaces and the determined number of data elements, a mapping technique from a plurality of mapping techniques;
    displaying, by the computing device, one or more three-dimensional surfaces corresponding to the determined number of three-dimensional surfaces to be displayed; and
    displaying, by the computing device, one or more data elements corresponding to the determined number of data elements to be included in the programming guide, the one or more data elements being mapped to the one or more three-dimensional surfaces according to the selected mapping technique.

16. The method of claim 15, further comprising:
    determining, by the computing device, whether the determined number of three-dimensional surfaces is greater than the determined number of data elements;
    in response to determining that the determined number of three-dimensional surfaces is greater than the determined number of data elements, selecting, by the computing device, the mapping technique that includes mapping at least two three-dimensional surfaces with the same data element.

17. The method of claim 15, further comprising:
    determining, by the computing device, whether the determined number of three-dimensional surfaces is greater than the determined number of data elements;
    in response to determining that the determined number of three-dimensional surfaces is greater than the determined number of data elements, selecting, by the computing device, the mapping technique that includes not displaying at least one three-dimensional surface.

18. The method of claim 15, wherein each three-dimensional surface is modifiable independently of at least one other three-dimensional surface.

19. The method of claim 18, wherein a three-dimensional surface is modified by modifying at least one associated structure attribute.

20. The method of claim 18, wherein a data element is modified by modifying at least one associated information attribute.

* * * * *